US012574857B2

(12) United States Patent
Urban

(10) Patent No.: US 12,574,857 B2
(45) Date of Patent: Mar. 10, 2026

(54) SYSTEMS AND METHODS FOR OPTIMIZING SIGNAL POWER

(71) Applicant: Comcast Cable Communications, LLC, Philadelphia, PA (US)

(72) Inventor: David J. Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 414 days.

(21) Appl. No.: 18/305,810

(22) Filed: Apr. 24, 2023

(65) Prior Publication Data

US 2024/0357511 A1 Oct. 24, 2024

(51) Int. Cl.
*H04W 52/24* (2009.01)

(52) U.S. Cl.
CPC ....... *H04W 52/242* (2013.01); *H04W 52/243* (2013.01)

(58) Field of Classification Search
CPC .............. H04W 16/28; H04W 52/367; H04W 52/146; H04W 52/143; H04W 52/267; H04W 72/0473; H04W 4/02; H04W 52/325; H04W 52/10
See application file for complete search history.

(56) References Cited

U.S. PATENT DOCUMENTS

| 2018/0248720 A1* | 8/2018 | Park | .................... | H04B 7/0626 |
| 2019/0036578 A1* | 1/2019 | Zirwas | ................ | H04B 7/0469 |

* cited by examiner

*Primary Examiner* — Tu X Nguyen

(74) *Attorney, Agent, or Firm* — BakerHostetler

(57) ABSTRACT

Methods and systems for optimizing received signal power and/or physical layer (PHY) rate are disclosed. A first device comprising a plurality of antennas associated with a plurality of phase differences may cause sending of a plurality of signals to a second device. Data indicating a first phase difference of the plurality of phase differences may be received from the second device. Based on the first phase difference, it may be determined that a line of sight (LOS) path between the first device and the second device is unobstructed. Based on determining that the LOS path between the first device and the second device is unobstructed, a transmit power associated with the first phase difference may be determined.

20 Claims, 8 Drawing Sheets

400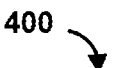

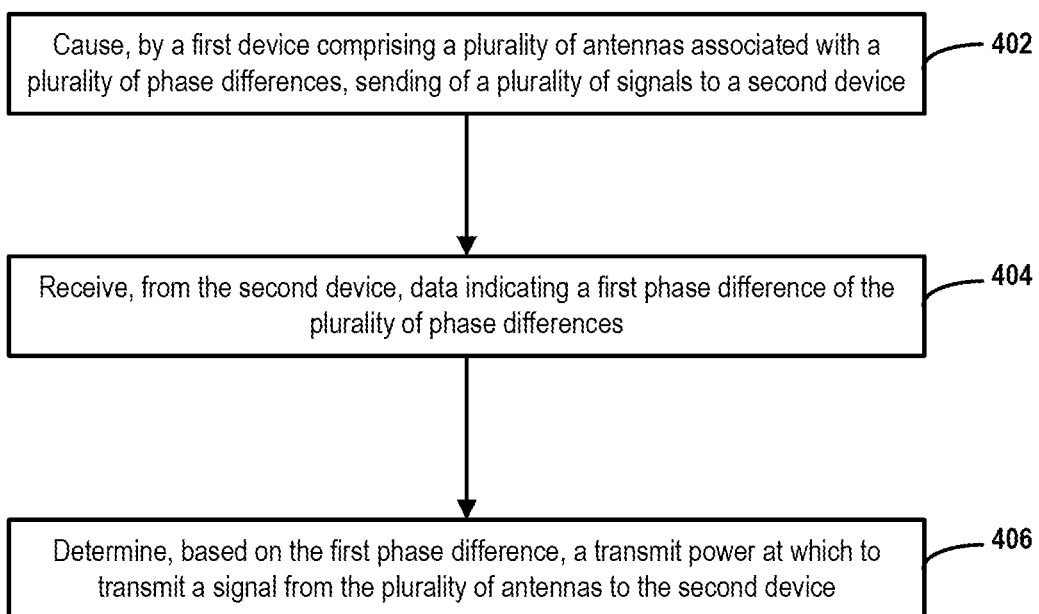

Cause, by a first device comprising a plurality of antennas associated with a plurality of phase differences, sending of a plurality of signals to a second device — 402

Receive, from the second device, data indicating a first phase difference of the plurality of phase differences — 404

Determine, based on the first phase difference, a transmit power at which to transmit a signal from the plurality of antennas to the second device — 406

FIG. 4

500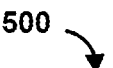

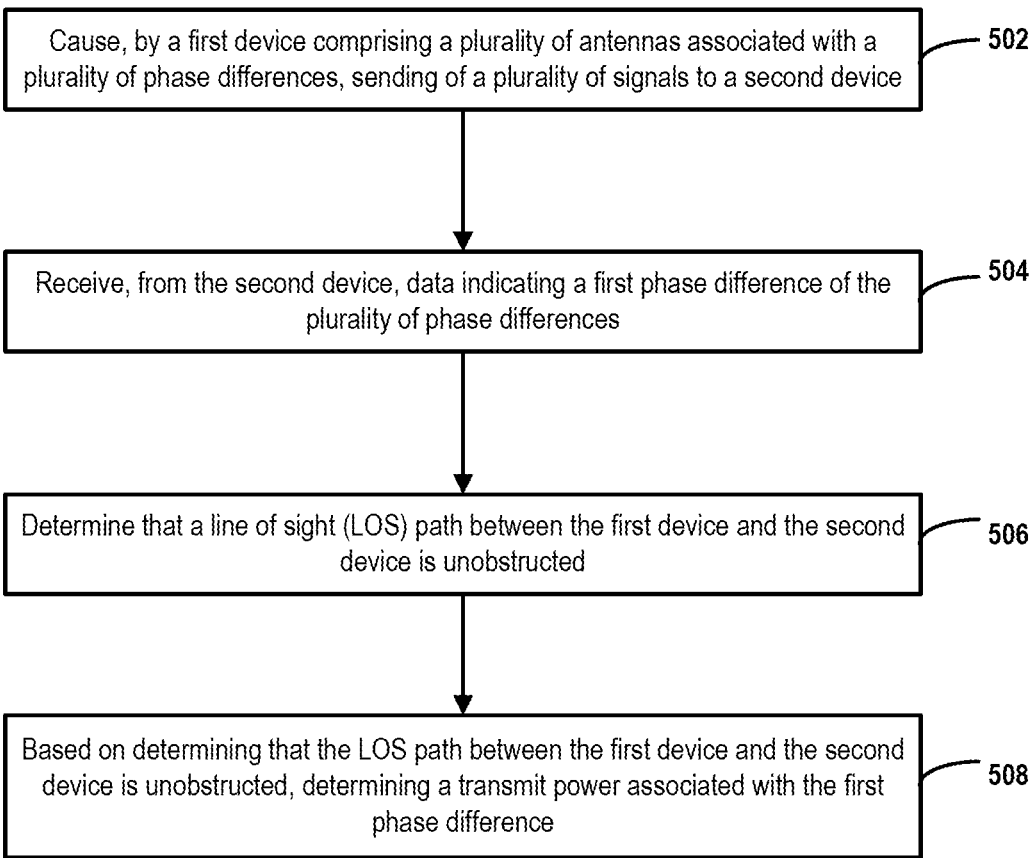

Cause, by a first device comprising a plurality of antennas associated with a plurality of phase differences, sending of a plurality of signals to a second device — 502

Receive, from the second device, data indicating a first phase difference of the plurality of phase differences — 504

Determine that a line of sight (LOS) path between the first device and the second device is unobstructed — 506

Based on determining that the LOS path between the first device and the second device is unobstructed, determining a transmit power associated with the first phase difference — 508

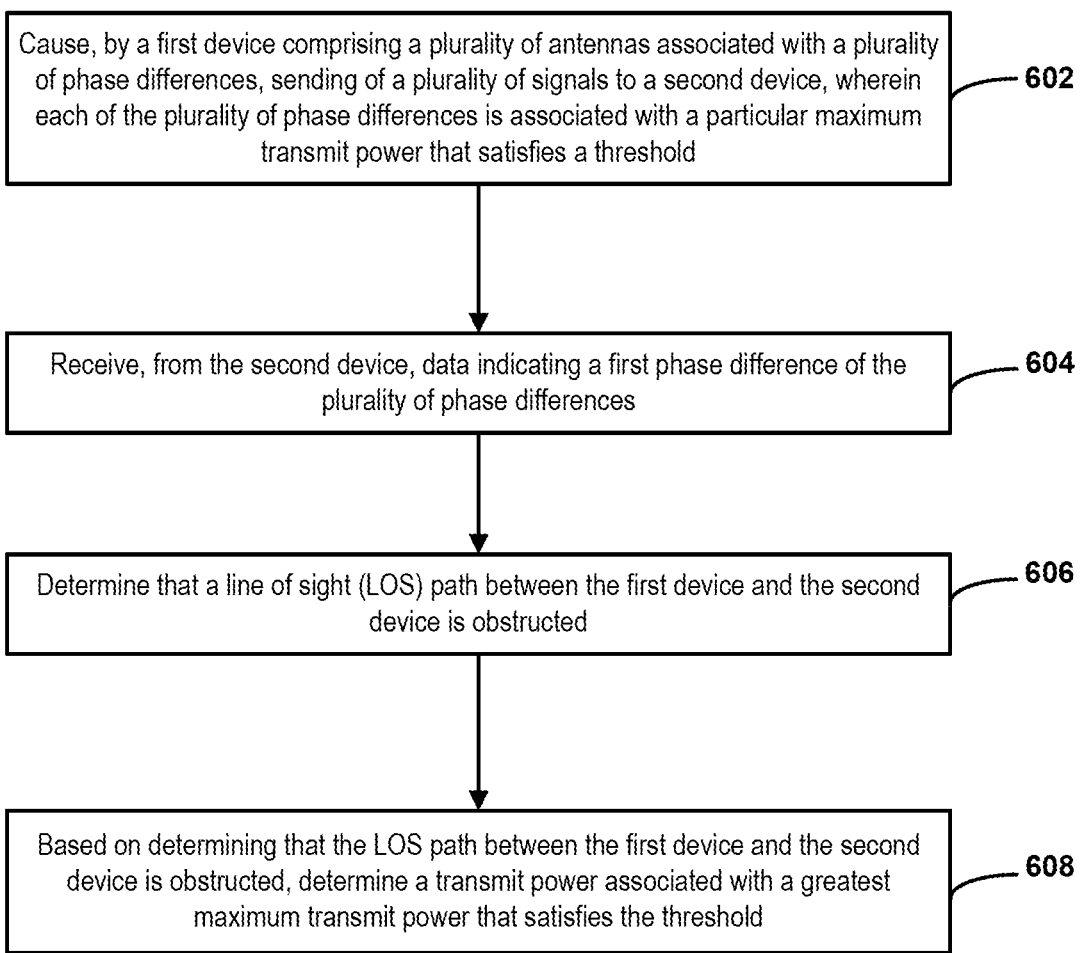

Cause, by a first device comprising a plurality of antennas associated with a plurality of phase differences, sending of a plurality of signals to a second device, wherein each of the plurality of phase differences is associated with a particular maximum transmit power that satisfies a threshold — 602

Receive, from the second device, data indicating a first phase difference of the plurality of phase differences — 604

Determine that a line of sight (LOS) path between the first device and the second device is obstructed — 606

Based on determining that the LOS path between the first device and the second device is obstructed, determine a transmit power associated with a greatest maximum transmit power that satisfies the threshold — 608

FIG. 6

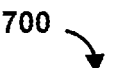

700

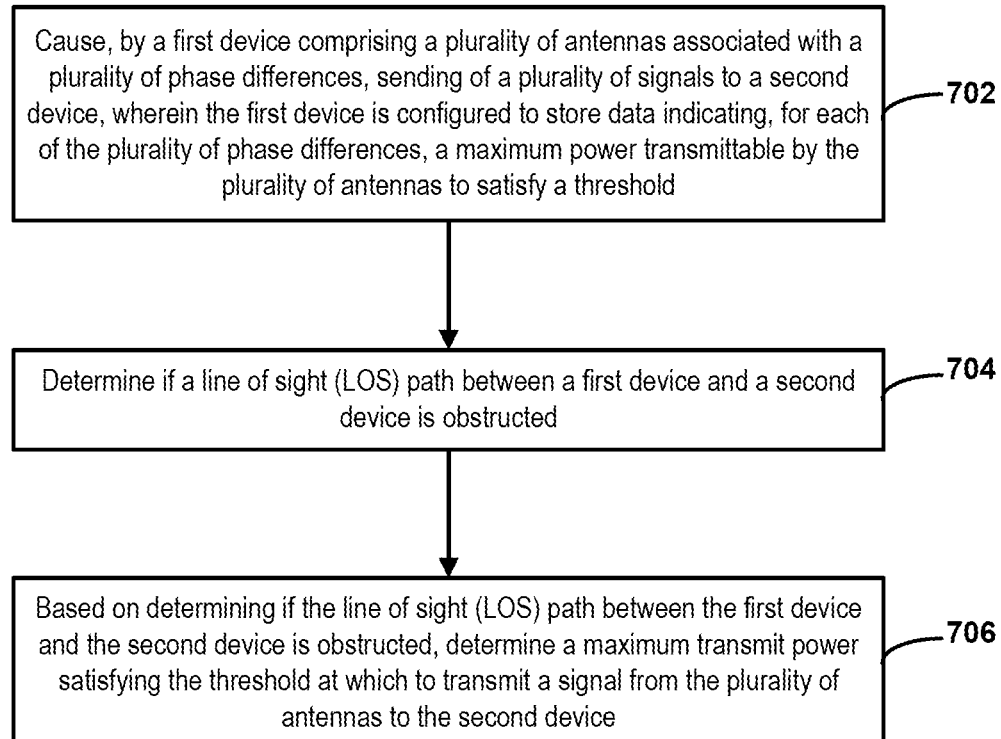

Cause, by a first device comprising a plurality of antennas associated with a plurality of phase differences, sending of a plurality of signals to a second device, wherein the first device is configured to store data indicating, for each of the plurality of phase differences, a maximum power transmittable by the plurality of antennas to satisfy a threshold ⟩—702

Determine if a line of sight (LOS) path between a first device and a second device is obstructed ⟩—704

Based on determining if the line of sight (LOS) path between the first device and the second device is obstructed, determine a maximum transmit power satisfying the threshold at which to transmit a signal from the plurality of antennas to the second device ⟩—706

FIG. 7

SYSTEMS AND METHODS FOR OPTIMIZING SIGNAL POWER

BACKGROUND

Regulatory bodies, such as the Federal Communications Commission (FCC), may require approval (e.g., type acceptance) of devices comprising radio equipment. For example, regulatory bodies may require that the manufacturers of such devices submit proof that the devices comply with regulatory limits. The proof may indicate, for example, that the effective radiated power spectral density of the radio equipment does not exceed regulatory limits. However, configuring such devices to comply with regulatory limits may negatively impact the ability of the devices to communicate with receiver devices. Therefore, techniques to optimize received signal power are desirable.

SUMMARY

Methods and systems for optimizing received signal power and/or physical layer (PHY) rate are disclosed. A computing device (e.g., access point, gateway device, etc.) may comprise a plurality of antennas. The plurality of antennas may be associated with a plurality of antenna configurations. The computing device may store data indicating, for each of the plurality of antenna configurations, a maximum transmit level associated with each of a plurality of phase differences. The maximum transmit level associated with a particular phase difference may indicate a maximum power transmittable by the plurality of antennas to satisfy a threshold. The threshold may comprise a regulatory limit.

The computing device may further cause a plurality of sounding signals to be sent to a receiving device. The receiving device may, based on receiving the plurality of sounding signals, cause beamforming feedback to be sent to the computing device. The computing device may utilize the beamforming feedback to determine if a direct path between the computing device and the receiving device is obstructed. A beamforming setting associated with the computing device may be set based on determining if the direct path between the computing device and the receiving device is obstructed. The beamforming setting may be set based on a first phase difference of the plurality of phase differences. The computing device may cause sending of a signal by the plurality of antennas to the receiving device based on the maximum power associated with the first phase difference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 4 is an example method.
FIG. 5 is an example method.
FIG. 6 is an example method.
FIG. 7 is an example method.

DETAILED DESCRIPTION OF ILLUSTRATIVE EMBODIMENTS

Methods and systems for optimizing received signal power and/or physical layer (PHY) rate are disclosed. A computing device (e.g., access point, gateway device, etc.) may comprise a plurality of antennas. The plurality of antennas may be associated with a plurality of antenna configurations. For each of the plurality of antenna configurations, data indicating a maximum transmit level for each of a plurality of phase differences may be determined. The maximum transmit level associated with a particular phase difference may indicate a maximum power transmittable by the plurality of antennas to satisfy a threshold. The threshold may comprise a regulatory limit, such as an effective isotopic radiated power (EIRP) threshold. The data may be determined in an anechoic chamber. The data may be sent to one or more regulatory bodies, such as for type acceptance.

The data may be stored in the computing device. Storing the data in the computing device may ensure that the computing device is able to operate at the maximum allowed EIRP without exceeding the maximum allowed EIRP. The computing device may send a sounding (e.g., test) signal on each antenna to a second device (e.g., station, receiving device, etc.). The second device may provide beamforming feedback for each of the plurality of antennas. The beamforming feedback may indicate a direction of the second device, the location of the second device, and/or a path loss between the computing device and the second device. Based on the beamforming feedback, the computing device may determine a phase difference at which to transmit a signal to the second device. The computing device may transmit the signal to the second device based on the maximum transmit power corresponding to the determined phase difference, as indicated by the stored data.

Using the beamforming feedback to determine the phase difference at which to transmit a signal to the second device may ensure that the signal is transmitted at the highest power possible without exceeding the regulatory limit. The beamforming feedback may indicate that a signal may be transmitted to the second device at a higher power than otherwise indicated by the data stored in the computing device, while still complying with the regulatory limit. For example, if the beamforming feedback indicates that there is path loss, this may indicate that a higher transmit power than indicated by the stored data may be used, while still complying with the regulatory limit.

Figure 1:
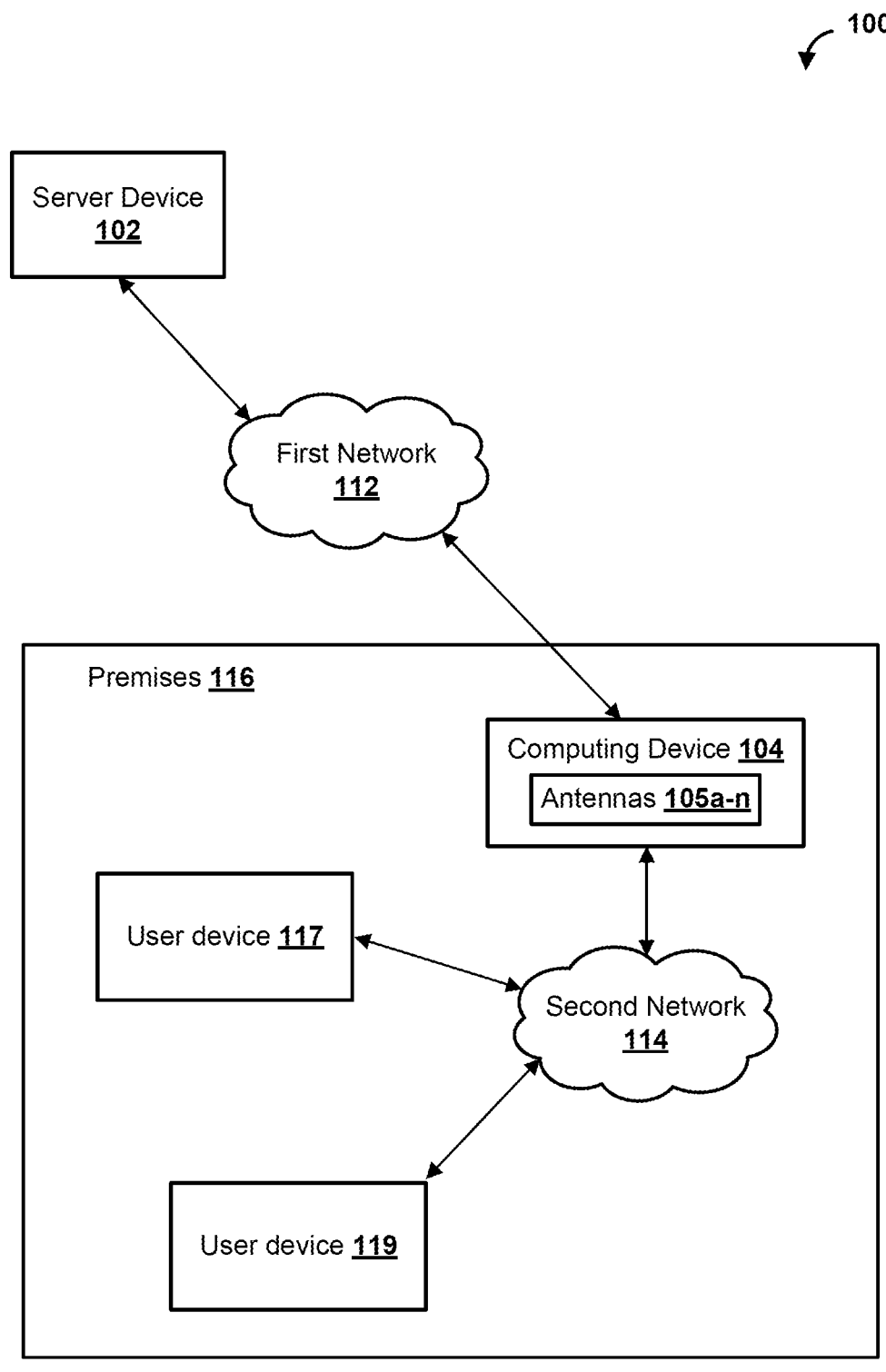
FIG. 1 is an example system.

FIG. 1 shows a block diagram of an example system 100. The system 100 may comprise a server device 102, a computing device 104, a user device 117, and a user device 119, or any combination thereof. It should be noted that while the singular term device is used herein, it is contemplated that some devices may be implemented as a single device or a plurality of devices (e.g., via load balancing). The server device 102, the computing device 104, the user device 117, and the user device 119 may each be implemented as one or more computing devices. Any device disclosed herein may be implemented using one or more computing nodes, such as virtual machines, executed on a single device and/or multiple devices.

The server device 102, the computing device 104, the user device 117, and the user device 119 may be communicatively coupled via one or more networks, such as a first network 112 (e.g., a wide area network) and one or more second networks 114 (e.g., one or more local area networks). The first network 112 may comprise a content distribution and/or access network. The first network 112 may facilitate communication via one or more communication protocols. The first network 112 may comprise fiber, cable, a combination thereof. The first network 112 may comprise wired links, wireless links, a combination thereof, and/or the like. The first network 112 may comprise routers, switches, nodes, gateways, servers, modems, and/or the like.

The one or more second networks 114 may comprise one or more networks in communication with the computing device 104, the user device 117, and/or the user device 119. The one or more second networks 114 may comprise one or more networks at a premises 116. The premises 116 may be a customer premises. The premises 116 may include an area within a coverage range (e.g., wireless range) of the computing device 104. The premises 116 may comprise a property, dwelling, terminal, building, floor, and/or the like. The premises 116 may comprise different rooms, walls, door, windows, and/or the like. The user device 117 and/or the user device 119 may move within the premises 116 and/or outside of the premises.

The computing device 104 may comprise a network device, an access point (e.g., wireless access point), a gateway device, a router, a modem, device controller (e.g., premises device controller) a combination thereof, and/or the like. The computing device 104 may be configured to communicate using the one or more second networks 112 at the premises 114. The computing device 104 may be configured to implement one or more services associated with the server device 102 (e.g., or with the premises 116, a user account), such as a network service, content service, a premises service, communication service, a combination thereof.

The server device 102 may be configured to provide one or more services, such as account services, application services, network services, content services, or a combination thereof. The server device 102 may comprise services for one or more applications on the user device 117 and/or the user device 119. The server device 102 may generate application data associated with the one or more application services. The application data may comprise data for a user interface, data to update a user interface, data for an application session associated with the user device 117 and/or the user device 119 and/or the like.

The user device 117 and/or the user device 119 may comprise a station, a computing device, a smart device (e.g., smart glasses, smart watch, smart phone), a mobile device, a tablet, a computing station, a laptop, a digital streaming device, a set-top box, a streaming stick, a television, and/or the like. In some scenarios, a user may have multiple user devices, such as a mobile phone, a smart watch, smart glasses, a combination thereof, and/or the like. The user device 117 and/or the user device 119 may be configured to communicate with the computing device 104, the server device 102, and/or the like.

The computing device 104 may comprise a plurality of antennas 105a-n. The plurality of antennas 105a-n may be configured to transmit wireless signals, such as to the user device 117 and/or to the user device 119. The plurality of antennas 105a-n may be configured to receive wireless signals, such as from the user device 117 and/or from the user device 119. The computing device 104 may employ Multiple Input Multiple Output (MIMO) technology. Thus, the plurality of antennas 105a-n may comprise multiple antennas for transmitting and receiving wireless signals, such as to and from the user device 117 and/or the user device 119.

The plurality of antennas 105a-n may be associated with a plurality of antenna configurations. Each antenna configuration of the plurality of antenna configurations may be associated with at least a subset of antennas from the plurality of antennas 105a-n and the fixed locations of those antennas in the computing device 104. Each antenna configuration of the plurality of antenna configurations may be configured to transmit wireless signals, such as to the user device 117 and/or to the user device 119. Each antenna configuration of the plurality of antenna configurations may be configured to transmit wireless signals at a phase difference selected from a phase difference range. For example, an antenna configuration associated with two antennas from the plurality of antennas 105a-n (e.g., a two-antenna configuration) may be configured to transmit wireless signals at a phase difference selected from a phase difference range of −90 degrees to +90 degrees. As used herein, the phrase phase difference may refer to the phase difference between the transmitted signals from each antenna in the antenna configuration. The phase difference between the transmitted signals from each antenna in the antenna configuration may indicate a measure in degrees of how much one wave leads another wave or lags behind that wave.

Each antenna configuration may, for each phase difference in the phase difference range, be able to transmit signals at a particular maximum power (e.g., maximum transmit power) while still complying with one or more regulatory limits. The regulatory limit(s) may comprise an effective isotopic radiated power (EIRP) threshold. To comply with the regulatory limit(s), the EIRP threshold may be satisfied. For example, an EIRP under +5 dBm may satisfy the EIRP threshold. Thus, an antenna configuration may be able to transmit a signal, using a particular phase difference, at the corresponding maximum transmit power while causing (e.g., generating) an EIRP of less than +5 dBm.

The computing device 104 may store data (e.g., transmit power data). The transmit power data may indicating the maximum transmit power corresponding to each phase difference for each antenna configuration. For example, as described above, a two-antenna configuration may be configured to transmit wireless signals at a phase difference selected from a phase difference range of −90 degrees to +90 degrees. Thus, the computing device 104 may store data, associated with a two-antenna configuration, indicating, for each phase difference in the range of −90 degrees to +90 degrees, a maximum transmit power that ensures that the regulatory limit(s) are being complied with. Similar data may be stored for each antenna configuration of the antenna configuration.

Figure 2:
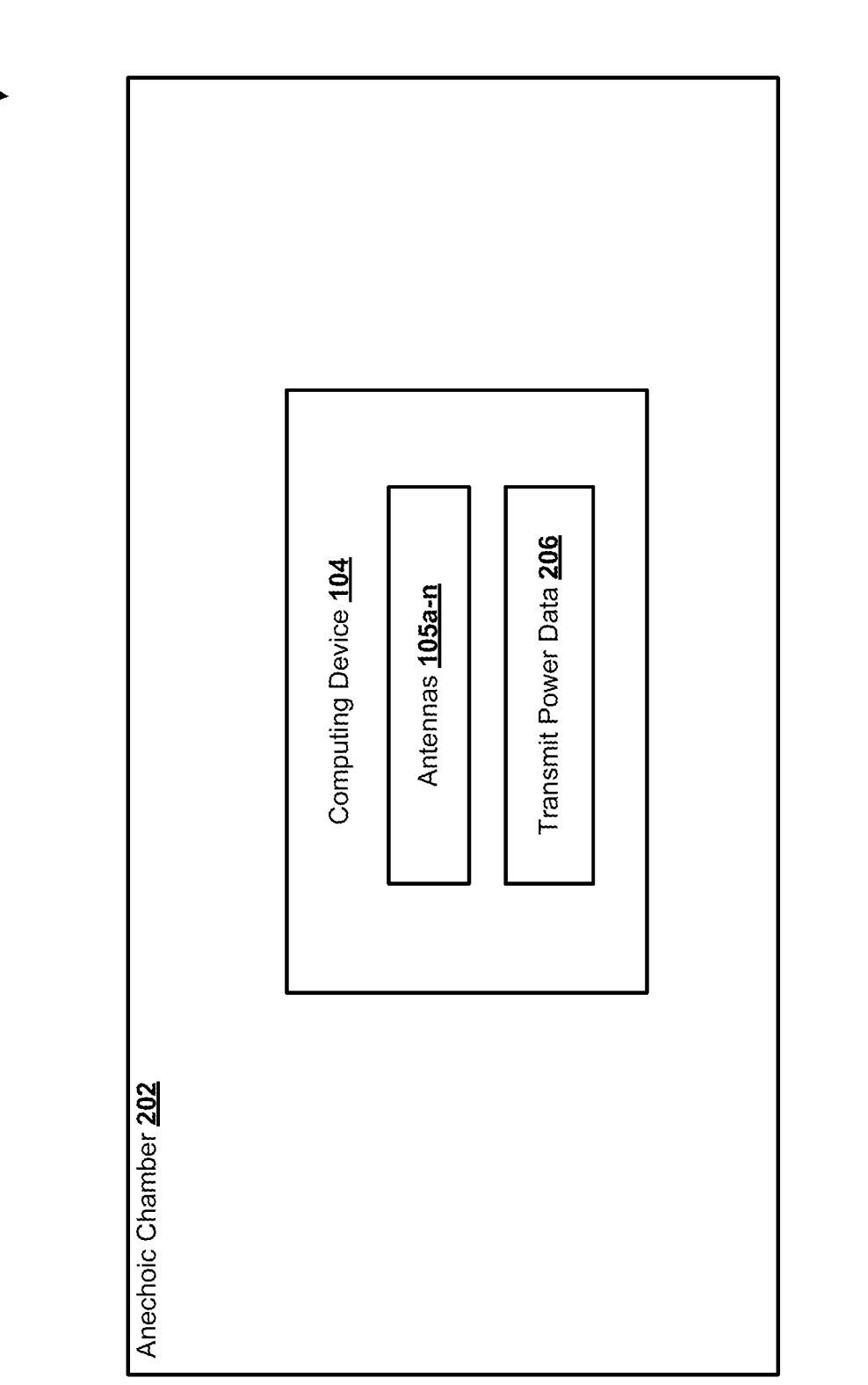
FIG. 2 is an example system.

FIG. 2 shows an example system 200 for determining transmit power data. The system 200 comprises the computing device 104 and an anechoic chamber 202. The transmit power data may be determined in the anechoic chamber 202. The computing device 104 may be placed in the anechoic chamber 202. To determine the transmit power, the full antenna pattern of the computing device 104 may be measured and stored in the computing device 104. The full antenna pattern of the computing device 104 may indicate each antenna configuration associated with the plurality of antennas 105a-n. The antenna gain may be different for every point on a sphere surrounding the computing device 104 in the far field. These points on the sphere may each be associated with one or more of an azimuthal angle, an elevation angles, a theta value, and a phi value. Thus, each antenna configuration associated with the plurality of antennas 105a-n may be associated with a particular maximum transmit power for each phase difference.

The maximum transmit power versus phase difference for each antenna configuration associated with the plurality of antennas 105a-n may be measured (e.g., recorded) in the anechoic chamber 202. For example, for a two-antenna configuration and for each of the phase differences (e.g., −90 degrees, −89 degrees, . . . , 89 degrees, 90 degrees), the transmit power may be adjusted so that the regulatory limit(s) are complied with. For example, the transmit power for each phase difference may be adjusted so that nowhere does the EIRP exceed +5 dBm. By adjusting the transmit power for every phase difference so that the regulatory limit(s) are complied with, maximum transmit power may be determined. The maximum transmit power for each antenna configuration at each phase difference may be stored in the computing device 104 as transmit power data 204. The transmit power data 204 may be sent to one or more regulatory bodies, such as to the FCC, for type acceptance of the computing device 104.

The computing device 104 may comprise one or more internal scatterers 204a-n. The internal scatterer(s) 204a-n may comprise one or more components of the computing device 104 that are configured to scatter or reflect rays or waves inside of the computing device 104. The internal scatterer(s) 204a-n may comprise, for example, a printed circuit board (PCB) and/or a heat sink. The transmit power data 204 may reflect any scattering internal to the computing device 104 that may result from the internal scatterer(s) 204a-n. The rays or waves reflected from the internal scatterer(s) 204a-n may add or subtract to the actual radiation emitted from the plurality of antennas 105a-n. For example, at least a subset of the internal scatterer(s) 204a-n may lower peak antenna gain associated with a particular antenna configuration. If the internal scatterer(s) 204a-n lower peak antenna gain associated with a particular antenna configuration, the maximum transmit power for that antenna configuration may be higher than it otherwise would be if the internal scatterer(s) 204a-n that lower peak antenna gain were not present inside of the computing device 104. At least a subset of the internal scatterer(s) 204a-n may increase peak antenna gain associated with a particular antenna configuration. If the internal scatterer(s) 204a-n increase peak antenna gain associated with a particular antenna configuration, the maximum transmit power for each antenna configuration may need to be reduced below what it would otherwise be if the internal scatterer(s) 204a-n that increase peak antenna gain were not present inside of the computing device 104.

Figure 3:
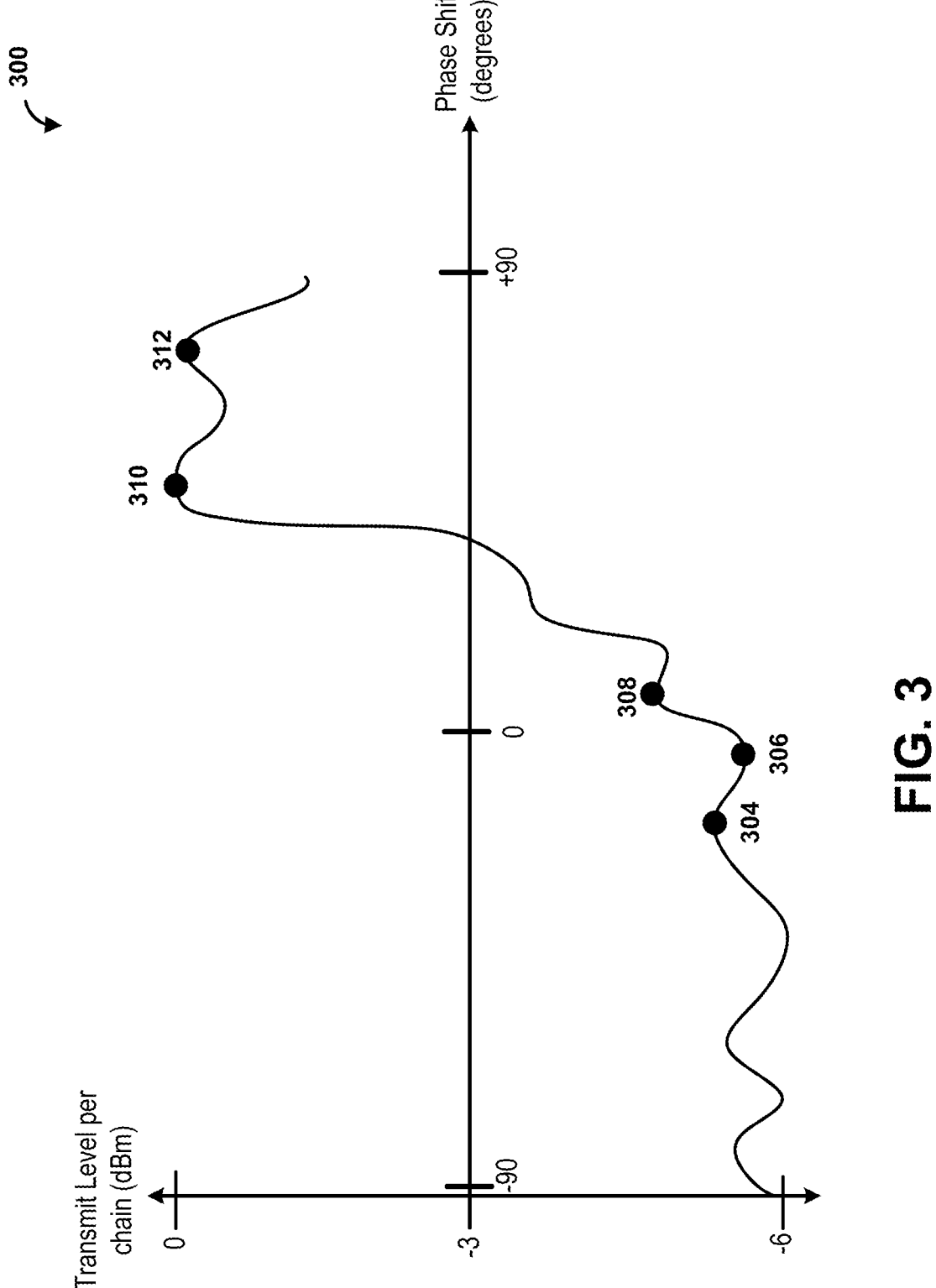
FIG. 3 is an example graph.

FIG. 3 shows a graph 300 of transmit power data for a two-antenna configuration. The graph 300 shows a maximum transmit level (dBm) per chain as a function of phase difference (degrees). The graph 300 shows, for each phase difference, a maximum transmit level that may be transmitted per chain while complying with regulatory limit(s). The graph 300 shows, for example, that at a phase difference of −90 degrees, each chain of the two-antenna configuration may transmit at a maximum level of −6 dBm while complying with regulatory limit(s). At a phase difference of 0 degrees, each chain of the two-antenna configuration may transmit at a maximum level of −5.5 dBm while complying with regulatory limit(s). At a phase difference of +90 degrees, each chain of the two-antenna configuration may transmit at a maximum level of −1.5 dBm while complying with regulatory limit(s).

Referring back to FIG. 1, the computing device 104 may be configured to send one or more sounding signals to the user device 117. For example, the computing device 104 may be configured to send a sounding signal on each antenna of the plurality of antennas 105a-n to the user device 117. The user device 117 may send beamforming feedback to the computing device 104. The user device 117 may send beamforming feedback to the computing device 104 based on receiving the one or more sounding signals.

The beamforming feedback may indicate to the computing device 104 how to send a signal to the user device 117. For example, the beamforming feedback may indicate an antenna configuration and/or a phase difference that the computing device 104 should use to send a signal to the user device 117. The beamforming feedback may indicate a location of the user device 117. For example, the beamforming feedback may indicate the direction of the user device 117 and/or a point or location of the user device 117 in a sphere surrounding the user device 104. The beamforming feedback may indicate reflections that are not present in a range of the antenna configuration. If reflections at the premises 116 obfuscate or mask the actual location of the user device 117, the user device 117 may provide location information to the computing device 104 through another means, such as through global positioning system (GPS) data or ultra-wideband (UWB) data.

The beamforming feedback may indicate a path loss model. The path loss model may indicate a decrease in the power of a signal propagating away from the computing device 104 towards the user device 117. The actual path loss measured between the user device 117 and the computing device 104 may be used to compensate for the differences between the EIRP for a pure plane wave and that of the computing device 104 in operation.

The computing device 104 may be configured to determine a transmit power at which to transmit a signal to the user device 117. The computing device 104 may be configured to determine a transmit power at which to transmit a signal to the user device 117 based on the beamforming feedback. To determine the transmit power at which to transmit a signal to the user device 117, the computing device 104 may use the phase difference indicated by the beamforming feedback. Determining the transmit power at which to transmit a signal to the user device 117 based on the phase difference indicated by the beamforming feedback may comprise determining if the direct path to the user device 117 is obstructed.

The computing device 104 may be configured to determine if the direct path to the user device 117 is obstructed. For example, the computing device 104 may be configured to determine if the direct path to the user device 117 is obstructed due to an obstruction or scatterer located external to the computing device 104 at the premises 116. The obstruction or scatterer located external to the computing device 104 may comprise, for example, a wall, door, etc. The computing device 104 may be configured to determine if the direct path to the user device 117 is obstructed based on the beamforming feedback.

To determine if the direct path to the user device 117 is obstructed, the computing device 104 may determine a direction from the computing device 104 to the user device 117. The computing device 104 may determine a direction from the computing device 104 to the user device 117 based on the phase difference indicated by the beamforming feedback. The computing device 104 may determine if the direction is pointed at the user device 117. The computing device 104 may determine if the direction indicated by the beamforming feedback is actually pointed at the user device 117. The computing device 104 may determine if the direction indicated by the beamforming feedback is actually pointed at the user device 117 based on comparing the direction to the peak indicated by the transmit power data. For example, the peak indicated by the peak transmit power data of FIG. 3 may correspond to the phase difference with the highest transmit level. The phase difference with the highest transmit level may correspond to the global minimum or maximum of the graph 300. The global maximum of the graph 300 may be the phase difference of +45 degrees. The phase difference of +45 degrees may correspond to the point 310 on the graph 300.

Comparing the direction to the peak indicated by the transmit power data may comprise comparing the direction to the phase difference associated with the highest transmit power indicated by the transmit power data. If the direction corresponds to the phase difference indicated by the transmit power data, it may be determined that the direct path to the user device 117 is unobstructed. The direction may correspond to the peak indicated by the transmit power data if the phase difference indicated by the beamforming feedback is the same as, or approximately the same as, the phase difference associated with the highest transmit power indicated by the transmit power data. For example, referring to FIG. 3, if the direction indicated by the beamforming feedback corresponds to the phase difference of +45 degrees it may be determined that the direct path to the user device 117 is unobstructed.

The computing device 104 may be configured to determine an optimal phase difference at which to transmit a signal to the user device 117. If the direct path to the user device 117 is unobstructed, the computing device 104 may determine a PHY rate and/or RSSI associated with transmitting a signal to the user device 117 at the phase difference indicated by the beamforming feedback (e.g., the first phase difference). As the direct path to the user device 117 is unobstructed, it may be assumed that the first phase difference is close to the optimal phase difference.

However, in certain environments the first phase difference may not actually be the optimal phase difference. For example, the first phase difference may not be the optimal phase difference to a variety of factors, including imperfections associated with the plurality of antennas 105a-n, scatterers internal to the computing device 104, scatterers external to the computing device 104, and/or a combination thereof. To determine if the first phase difference is the optimal phase difference, one or more highest peaks local to (e.g., nearby) the first phase difference may be determined. The highest local peak(s) may indicate one or more different phase differences that are slightly smaller than or larger than the first phase difference. A PHY rate and/or RSSI associated with transmitting a signal to the user device 117 at each of the different phase differences may be determined.

If the PHY rate and/or RSSI associated with the different phase difference(s) are all smaller than the PHY rate and/or RSSI associated with the first phase difference, this may indicate that the first phase difference is the optimal phase difference. If the PHY rate and/or RSSI associated with one of the different phase differences is greater than the PHY rate and/or RSSI associated with the first phase difference, this may indicate that the first phase difference is not the optimal phase difference. For example, if the PHY rate and/or RSSI associated with a particular different phase difference (e.g., a second phase difference) is greater than the PHY rate and/or RSSI associated with the first phase difference, it may be determined that the second phase difference is the optimal phase difference. As discussed above, the PHY rate and/or RSSI associated with a second phase difference may be greater than the PHY rate and/or RSSI associated with the first phase difference due to a variety of factors, including imperfections associated with the plurality of antennas 105a-n, scatterers internal to the computing device 104, scatterers external to the computing device 104, and/or a combination thereof.

Referring back to the example of FIG. 3, the beamforming feedback transmitted from the user device 117 to the computing device 104 may indicate a phase difference of −4 degrees. The phase difference indicated by the beamforming feedback may be represented by the point 306 on the graph 300. A PHY rate and/or RSSI associated with transmitting a signal to the user device 117 at a phase difference of −4 degrees may be determined. One or more of the highest peaks local to (e.g., nearby) the phase difference of −4 degrees may be determined. The highest local peak(s) may comprise one or more local minimums or maximums in the graph 300 that are located proximate to the point 306. For example, the highest local peak(s) may comprise the local maximum located at point 304 and/or the local maximum located at point 308. The local maximum located at point 304 may correspond to the phase difference of −20 degrees. The local maximum located at point 308 may correspond to the phase difference of +8 degrees. A PHY rate and/or RSSI associated with transmitting a signal to the user device 117 at the phase difference of −20 degrees and/or +8 degrees may be determined.

If the PHY rate and/or RSSI associated with transmitting a signal to the user device 117 at the phase difference of −4 degrees is greater than the PHY rate and/or RSSI associated with transmitting a signal to the user device 117 at the phase difference of −20 degrees and/or +8 degrees, this may indicate that the phase difference of −4 degrees is the optimal phase difference. If the PHY rate and/or RSSI associated with transmitting a signal to the user device 117 at the phase difference of −20 degrees is greater than the PHY rate and/or RSSI associated with transmitting a signal to the user device 117 at the phase difference of −4 degrees and/or +8 degrees, this may indicate that the phase difference of −20 degrees is the optimal phase difference. If the PHY rate and/or RSSI associated with transmitting a signal to the user device 117 at the phase difference of +8 degrees is greater than the PHY rate and/or RSSI associated with transmitting a signal to the user device 117 at the phase difference of −4 degrees and/or −20 degrees, this may indicate that the phase difference of +8 degrees is the optimal phase difference.

Referring back to FIG. 1, the computing device 104 may be configured to cause a beamforming setting of the computing device 104 to be set based on the optimal phase difference. Causing the beamforming setting of the computing device 104 to be set based on the optimal phase difference may comprise storing data indicating the optimal phase difference for transmitting a signal to the user device 117. For example, data indicating the optimal phase difference for transmitting a signal to the user device 117 may be stored in the computing device 104. The data may indicate to the computing device 104 that it should use the optimal phase difference for transmitting signals to the user device 117. Thus, if the computing device 104 attempts to send a signal to the user device 117 again at some time in the future, the computing device 104 may not need to determine the optimal phase difference again at that time. Instead, the computing device 104 may utilize the data indicating the optimal phase difference for transmitting a signal to the user device 117 for quick optimization beamforming.

The computing device 104 may be configured to cause sending of a signal by the plurality of antennas to the user device 117 based on the beamforming setting. For example, the computing device 104 may be configured to cause sending of a signal by the plurality of antennas to the user device 117 using the optimal phase difference indicated by the beamforming setting corresponding to the user device 117. Causing sending of a signal by the plurality of antennas to the user device 117 using the optimal phase difference indicated by the beamforming setting corresponding to the user device 117 may comprise transmitting a signal to the user device 117 based on the maximum transmit power corresponding to the optimal phase difference.

The computing device 104 may be configured to send one or more sounding signals to the user device 119. For example, the computing device 104 may be configured to send a sounding signal on each antenna of the plurality of antennas 105a-n to the user device 119. The user device 119 may send beamforming feedback to the computing device 104. The user device 119 may send beamforming feedback to the computing device 104 based on receiving the one or more sounding signals. The beamforming feedback may indicate to the computing device 104 how to send a signal to the user device 119. For example, the beamforming feedback may indicate an antenna configuration and/or a phase difference that the computing device 104 should use to send a signal to the user device 119. The beamforming feedback may indicate a location of the user device 119. If reflections at the premises 116 obfuscate or mask the actual location of the user device 119, the user device 119 may provide location information to the computing device 104 through another means, such as through global positioning system (GPS) data or ultra-wideband (UWB) data. The beamforming feedback may indicate a path loss model. The path loss model may indicate a decrease in the power of a signal propagating away from the computing device 104 towards the user device 119.

The computing device 104 may be configured to determine if the direct path to the user device 119 is obstructed. For example, the computing device 104 may be configured to determine if the direct path to the user device 119 is obstructed due to an obstruction or scatterer located external to the computing device 104 at the premises 116. The obstruction or scatterer located external to the computing device 104 may comprise, for example, a wall, door, etc. The computing device 104 may be configured to determine if the direct path to the user device 119 is obstructed based on the beamforming feedback.

To determine if the direct path to the user device 119 is obstructed, the computing device 104 may determine a direction from the computing device 104 to the user device 119. The computing device 104 may determine a direction from the computing device 104 to the user device 119 based on the phase difference indicated by the beamforming feedback. The computing device 104 may determine if the direction is pointed at the user device 119. The computing device 104 may determine if the direction is pointed at the user device 119 based on comparing the direction to the peak indicated by the transmit power data. Comparing the direction to the peak indicated by the transmit power data may comprise comparing the direction to the phase difference associated with the highest transmit power indicated by the transmit power data. If the direction does not correspond to the peak indicated by the transmit power data, it may be determined that the direct path to the user device 119 is obstructed. The direction may not correspond to the peak indicated by the transmit power data if the phase difference indicated by the beamforming feedback is different from, or substantially different from, the phase difference associated with the highest transmit power indicated by the transmit power data.

The computing device 104 may be configured to determine an optimal phase difference at which to transmit a signal to the user device 119. If the direct path to the user device 119 is obstructed, it may be assumed that the phase difference indicated by the beamforming feedback is not the optimal phase difference. The phase difference associated with the highest transmit level, as indicated by the transmit power data, may be the "best guess" when determining the optimal phase difference. The phase difference associated with the highest transmit level may be the "best guess" when determining the optimal phase difference as beamforming with the phase difference that allows for a higher transmit power that may direct the signal at a good internal scatterer or reflector may result in a higher PHY rate or RSSI at the user device 119.

To determine the optimal phase difference, the computing device 104 may determine the phase difference associated with the highest transmit level. To determine the phase difference associated with the highest transmit level, the computing device 104 may utilize the transmit power data (e.g., transmit power data 206). The phase difference associated with the highest transmit level may be the phase difference that is associated with the greatest maximum transmit power, as indicated by the transmit power data. A PHY rate and/or RSSI associated with transmitting a signal to the user device 119 at the phase difference associated with the highest transmit level may be determined.

The computing device 104 may determine the phase difference with the second highest transmit level. To determine the phase difference associated with the second highest transmit level, the computing device 104 may utilize the transmit power data (e.g., transmit power data 206). The phase difference associated with the second highest transmit level may be the phase difference that is associated with the second greatest maximum transmit power, as indicated by the transmit power data. A PHY rate and/or RSSI associated with transmitting a signal to the user device 119 at the phase difference associated with the second highest transmit level may be determined. The computing device 104 may repeat this process any number of times. For example, the computing device 104 may determine the phase difference with the next highest (e.g., third highest, fourth highest, fifth highest, etc.) transmit level and determine a PHY rate and/or RSSI associated with transmitting a signal to the user device 119 at the phase difference associated with the next highest transmit level.

The computing device 104 may be configured to determine a peak PHY rate and/or RSSI. To determine the peak PHY rate and/or RSSI, the computing device 104 may compare the PHY rate and/or RSSI associated with transmitting a signal to the user device 119 at the phase difference associated with the highest transmit level to the PHY rate and/or RSSI associated with transmitting a signal to the user device 119 at the phase difference associated with the second highest transmit level. If the PHY rate and/or RSSI associated with transmitting a signal to the user device 119 at the phase difference associated with the highest transmit level is greater than the PHY rate and/or RSSI associated with transmitting a signal to the user device 119 at the phase difference associated with the second highest transmit level, this may indicate that the phase difference associated with the highest transmit level is a more optimal phase difference than the phase difference associated with the second highest transmit level. Thus, the phase difference associated with the highest transmit level may be determined to the optimal phase difference.

If the PHY rate and/or RSSI associated with transmitting a signal to the user device 119 at the phase difference associated with the second highest transmit level is greater than the PHY rate and/or RSSI associated with transmitting a signal to the user device 119 at the phase difference associated with the highest transmit level, this may indicate that the phase difference associated with the second highest transmit level is a more optimal phase difference than the phase difference associated with the highest transmit level. Thus, the phase difference associated with the second highest transmit level may be determined to the optimal phase difference.

If a PHY rate and/or RSSI associated with transmitting a signal to the user device 119 at the phase difference associated with a different transmit level (e.g., the third, fourth, fifth, etc. highest transmit level) is greater than the PHY rate and/or RSSI associated with transmitting a signal to the user device 119 at the phase difference associated with the highest transmit level and the second highest transmit level, this may indicate that the phase difference associated with the different transmit level is a more optimal phase difference than the phase difference associated with the highest transmit level or the second highest transmit level. Thus, the phase difference associated with the different transmit level may be determined to the optimal phase difference.

For example, referring again to the example of FIG. 3, the phase difference with the highest transmit level may correspond to the global minimum or maximum of the graph 300. The global maximum of the graph 300 may be the phase difference of +45 degrees. The phase difference of +45 degrees may correspond to the point 310 on the graph 300. A PHY rate and/or RSSI associated with transmitting a signal to the user device 119 at a phase difference of +45 degrees may be determined. The phase difference with the second highest transmit level may correspond to a second highest global peak of the graph 300. For example, the phase difference with the second highest transmit level may be the phase difference of +72 degrees. The phase difference of +72 degrees may correspond to the point 312 on the graph 300. A PHY rate and/or RSSI associated with transmitting a signal to the user device 119 at a phase difference of +72 degrees may be determined. This process may be repeated as many times as is desired.

Referring back to FIG. 1, the computing device 104 may be configured to cause a beamforming setting of the computing device 104 to be set based on the optimal phase difference. Causing the beamforming setting of the computing device 104 to be set based on the optimal phase difference may comprise storing data indicating the optimal phase difference for transmitting a signal to the user device 119. For example, data indicating the optimal phase difference for transmitting a signal to the user device 119 may be stored in the computing device 104. The data may indicate to the computing device 104 that it should use the optimal phase difference for transmitting signals to the user device 119. Thus, if the computing device 104 attempts to send a signal to the user device 119 again at some time in the future, the computing device 104 may not need to determine the optimal phase difference again at that time. Instead, the computing device 104 may utilize the data indicating the optimal phase difference for transmitting a signal to the user device 119 for quick optimization beamforming.

The computing device 104 may be configured to cause sending of a signal by the plurality of antennas to the user device 119 based on the beamforming setting. For example, the computing device 104 may be configured to cause sending of a signal by the plurality of antennas to the user device 119 using the optimal phase difference indicated by the beamforming setting corresponding to the user device 119. Causing sending of a signal by the plurality of antennas to the user device 119 using the optimal phase difference indicated by the beamforming setting corresponding to the user device 119 may comprise transmitting a signal to the user device 119 based on the maximum transmit power corresponding to the optimal phase difference.

FIG. 4 is an example method 400. The method 400 may comprise a computer implemented method for optimizing received signal power and/or physical layer (PHY) rate. A system and/or computing environment, such as the system 100 of FIG. 1 and/or the computing environment of FIG. 8, may be configured to perform the method 400. For example, the computing device 104 of FIG. 1 may be configured to perform the method 400.

A first device may comprise a plurality of antennas. The first device may be configured to store data. The data may indicate, for each of a plurality of phase differences associated with the plurality of antennas, a maximum power transmittable by the plurality of antennas to satisfy a threshold. The threshold may comprise an effective isotopic radiated power (EIRP) threshold. At 402, sending of a plurality of signals to a second device may be caused. The plurality of signals may comprise sounding signals. The sending of the plurality of signals to the second device may be caused by the first device. The first device may send a signal on each antenna of the plurality of antennas to the second device. Based on receiving the signal(s), the second device may send data (e.g., feedback) to the first device.

The data may be received by the first device. At 404, data indicating a first phase difference of the plurality of phase differences may be received. The first phase difference may comprise a phase difference at which to transmit a signal to the second device. The data may be received from the second device. The first device may receive data indicating a direction of the second device, the location of the second device, and/or a path loss between the computing device and the second device. At 406, a transmit power may be determined. The transmit power may comprise a power at which to transmit a signal from the plurality of antennas to the second device. The transmit power may be determined based on the first phase difference. For example, the transmit power may comprise the maximum transmit power corresponding to the first phase difference, as indicated by the stored data.

FIG. 5 is an example method 500. The method 500 may comprise a computer implemented method for optimizing received signal power and/or physical layer (PHY) rate. A system and/or computing environment, such as the system 100 of FIG. 1 and/or the computing environment of FIG. 8, may be configured to perform the method 500. For example, the computing device 104 of FIG. 1 may be configured to perform the method 500.

A first device may be configured to store data. The data may indicate, for each of a plurality of phase differences associated with a plurality of antennas, a maximum power transmittable by the plurality of antennas to satisfy an effective isotropic radiated power (EIRP) threshold. At 502, sending of a plurality of signals to a second device may be caused. The plurality of signals may comprise sounding signals. The sending of the plurality of signals to the second device may be caused by a first device. The first device may comprise a plurality of antennas. The plurality of antennas may be associated with a plurality of phase differences. The first device may send a sounding signal on each antenna of the plurality of antennas to the second device. The second device may send beamforming feedback to the first device. The second device may send beamforming feedback to the first device based on receiving the one or more sounding signals.

Beamforming feedback associated with the plurality of sounding signals may be received. The beamforming feedback may be received from the second device. The beamforming feedback may indicate a first phase difference of the plurality of phase differences. At 504, data indicating a first phase difference of the plurality of phase differences may be received. The data indicating the first phase difference may be received from the second device. Data indicating a location of the second device may be received. The data indicating the location of the second device may be received from the second device.

At 506, it may be determined that a line of sight (LOS) path between the first device and the second device is unobstructed. It may be determined that the LOS path between the first device and the second device is unobstructed based on the beamforming feedback and/or the data indicating the location of the second device. It may be determined that the LOS path is unobstructed based on the data indicating the first phase difference.

To determine if the direct path to the second device is obstructed, a direction from the first device to the second device may be determined. The direction from the first device to the second device may be determined based on the first phase difference indicated by the beamforming feedback. It may be determined if the direction is pointed at the second device. It may be determined if the direction is pointed at the second device based on comparing the direction to a peak indicated by the data stored in the first device. Comparing the direction to the peak indicated by the data may comprise comparing the direction to the phase difference associated with the highest maximum transmit power indicated by the data. If the direction corresponds to the peak indicated by the transmit power data, it may be determined that the direct path to the second device is unobstructed. The direction may correspond to the peak indicated by the transmit power data if the phase difference indicated by the beamforming feedback is the same as, or approximately the same as, the phase difference associated with the highest transmit power indicated by the data.

The first device may be configured to determine an optimal phase difference at which to transmit a signal to the second device. If the direct path to the second device is unobstructed, the first device may determine a PHY rate and/or RSSI associated with transmitting a signal to the second device at the first phase difference. As the direct path to the second device is unobstructed, it may be assumed that the first phase difference is close to the optimal phase difference.

At 508, a transmit power associated with the first phase difference may be determined. The transmit power may be determined based on the data stored by the first device. The transmit power may comprise the maximum power transmittable by the plurality of antennas at the first phase difference while still satisfying the EIRP threshold.

A beamforming setting associated with the first device may be caused to be set. The beamforming setting associated with the first device may be caused to be set based on the first phase difference. Causing the beamforming setting of the computing device to be set based on the first phase difference may comprise storing data indicating that the first phase difference is the optimal phase difference for transmitting a signal to the second device. For example, data indicating the optimal phase difference for transmitting a signal to the second device may be stored in the first device. The data may indicate to the first device that it should use the first phase difference for transmitting signals to the second device. Thus, if the first device attempts to send a signal to the second device again at some time in the future, the first device may not need to determine the optimal phase difference again at that time. Instead, the first device may utilize the data indicating the first phase difference as the optimal phase difference for transmitting a signal to the second device for quick optimization beamforming.

The first device may be configured to cause sending of a signal by the plurality of antennas to the second device based on the beamforming setting. For example, the first device may be configured to cause sending of a signal by the plurality of antennas to the second device using the first phase difference, as indicated by the beamforming setting corresponding to the second device. Causing sending of a signal by the plurality of antennas to the second device using the optimal phase difference indicated by the beamforming setting corresponding to the second device may comprise transmitting a signal to the second device based on the maximum transmit power corresponding to the first phase difference.

FIG. 6 is an example method 600. The method 600 may comprise a computer implemented method for optimizing received signal power and/or physical layer (PHY) rate. A system and/or computing environment, such as the system 100 of FIG. 1 and/or the computing environment of FIG. 8, may be configured to perform the method 600. For example, the computing device 104 of FIG. 1 may be configured to perform the method 600.

A first device may be configured to store data. The data may indicate, for each of a plurality of phase differences associated with a plurality of antennas, a maximum power transmittable by the plurality of antennas to satisfy an effective isotropic radiated power (EIRP) threshold. At 602, sending of a plurality of signals to a second device may be caused. The plurality of signals may comprise sounding signals. The sending of the plurality of signals to the second device may be caused by a first device. The first device may comprise a plurality of antennas. The plurality of antennas may be associated with a plurality of phase differences. The first device may send a signal on each antenna of the plurality of antennas to the second device. The second device may send beamforming feedback to the first device. The second device may send beamforming feedback to the first device based on receiving the one or more sounding signals.

Beamforming feedback associated with the plurality of sounding signals may be received. The beamforming feedback may be received from the second device. The beamforming feedback may indicate a particular phase difference of the plurality of phase differences. At 604, data indicating a first phase difference of the plurality of phase differences may be received. The data indicating the first phase difference may be received from the second device. Data indicating a location of the second device may be received. The data indicating the location of the second device may be received from the second device.

At 606, it may be determined that a line of sight (LOS) path between the first device and the second device is obstructed. It may be determined that the LOS path between the first device and the second device is obstructed based on the beamforming feedback and the data indicating the location of the second device. It may be determined that the LOS path is obstructed based on the data indicating the first phase difference.

To determine that the direct path to the second device is obstructed, a direction from the first device to the second device may be determined. The direction from the first device to the second device may be determined based on the phase difference indicated by the beamforming feedback. It may be determined if the direction is pointed at the second device. To determine if the direction is pointed at the second device, the direction may be compared to the peak indicated by the transmit power data. Comparing the direction to the peak indicated by the transmit power data may comprise comparing the direction to the phase difference associated with the highest maximum transmit power indicated by the data stored in the first device. If the direction does not correspond to the peak indicated by the transmit power data, it may be determined that the direct path to the second device is obstructed. The direction may not correspond to the peak indicated by the transmit power data if the phase difference indicated by the beamforming feedback is different from, or substantially different from, the phase difference associated with the highest transmit power indicated by the transmit power data.

At 608, a transmit power associated with a greatest maximum transmit power may be determined. The transmit power may be determined based on the data stored by the first device. The transmit power may comprise the greatest maximum power transmittable by the plurality of antennas while still satisfying the EIRP threshold.

A beamforming setting associated with the first device maybe caused to be set based on a first phase difference of the plurality of phase differences. The first phase difference may be associated with the greatest maximum transmit power that satisfies the EIRP threshold. If the direct path to the second device is obstructed, it may be assumed that the phase difference indicated by the beamforming feedback is not the optimal phase difference. Thus, the phase difference associated with the highest transmit level (e.g., the first phase difference), as indicated by the transmit power data, may be the "best guess" when determining the optimal phase difference. The first phase difference may be the "best guess" when determining the optimal phase difference as beamforming with the phase difference that allows for a higher transmit power that may direct the signal at a good internal scatterer or reflector may result in a higher PHY rate or RSSI at the second device.

FIG. 7 is an example method 700. The method 700 may comprise a computer implemented method for optimizing received signal power and/or physical layer (PHY) rate. A system and/or computing environment, such as the system 100 of FIG. 1 and/or the computing environment of FIG. 8, may be configured to perform the method 700. For example, the computing device 104 of FIG. 1 may be configured to perform the method 00.

A first device may be configured to store data. The data may indicate, for each of a plurality of phase differences associated with a plurality of antennas, a maximum power transmittable by the plurality of antennas to satisfy a threshold. The threshold may comprise an effective isotopic radiated power (EIRP) threshold. At 702, sending of a plurality of signals to a second device may be caused. The plurality of signals may comprise sounding signals. The sending of the plurality of signals to the second device may be caused by a first device. The first device may comprise a plurality of antennas. The plurality of antennas may be associated with a plurality of phase differences. The first device may send a signal on each antenna of the plurality of antennas to the second device. The second device may send beamforming feedback to the first device. The second device may send beamforming feedback to the first device based on receiving the one or more sounding signals.

At 704, it may be determined if a line of sight (LOS) path between a first device and a second device is obstructed. It may be determined if a line of sight (LOS) path between a first device and a second device is obstructed based at least on beamforming feedback associated with the plurality of signals. The beamforming feedback may indicate a particular phase difference of the plurality of phase differences. It may be determined that the LOS path is obstructed based on the phase difference indicated by the beamforming feedback. Data indicating a location of the second device may be received. The data indicating the location of the second device may be received from the second device.

To determine if the direct path to the second device is obstructed, a direction from the first device to the second device may be determined. The direction from the first device to the second device may be determined based on the phase difference indicated by the beamforming feedback. It may be determined if the direction is pointed at the second device. To determine if the direction is pointed at the second device, the direction may be compared to the peak indicated by the transmit power data. Comparing the direction to the peak indicated by the transmit power data may comprise comparing the direction to the phase difference associated with the highest maximum transmit power indicated by the data stored in the first device.

If the direction corresponds to the peak indicated by the transmit power data, it may be determined that the direct path to the second device is obstructed. The direction may correspond to the peak indicated by the transmit power data if the phase difference indicated by the beamforming feedback is substantially the same as the phase difference associated with the highest transmit power indicated by the transmit power data. If the direction does not correspond to the peak indicated by the transmit power data, it may be determined that the direct path to the second device is obstructed. The direction may not correspond to the peak indicated by the transmit power data if the phase difference indicated by the beamforming feedback is different from, or substantially different from, the phase difference associated with the highest transmit power indicated by the transmit power data.

At 706, a maximum transmit power may be determined. The maximum transmit power may satisfy the threshold. The maximum transmit power may be the transmit power at which the first device may transmit a signal to the second device while satisfying the threshold. If the LOS path between the first device and the second device is obstructed, determining the maximum transmit power may comprise determining a greatest maximum power indicated by the data stored by the first device. If the LOS path between the first device and the second device is unobstructed, determining the maximum transmit power may comprise determining the maximum power associated with the phase difference indicated by the beamforming feedback. The maximum power associated with the phase difference indicated by the beamforming feedback may be determined based on the data stored by the first device.

Figure 8:
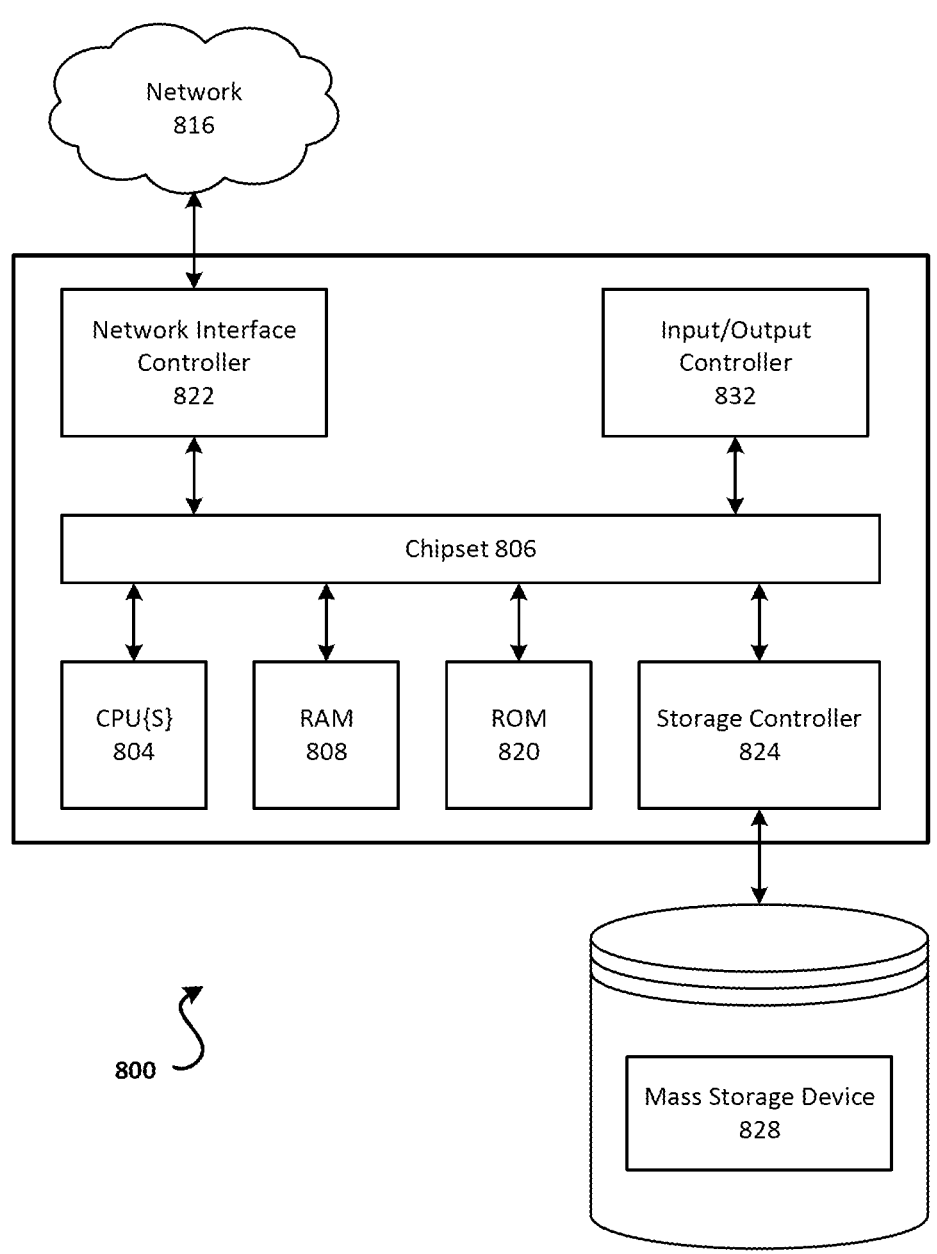
FIG. 8 is an example computing device.

FIG. 8 depicts a computing device that may be used in various aspects, such as the servers and/or devices depicted in FIG. 1. With regard to the example architecture of FIG. 1, the server device 102, the computing device 104, the user device 118, and/or the user device 119 may each be implemented in an instance of a computing device 800 of FIG. 8.

The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 4, FIG. 5, FIG. 6, and FIG. 7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described in relation to FIG. 4, FIG. 5, and FIG. 6.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
causing, by a first device comprising a plurality of antennas associated with a plurality of phase differences, sending of a plurality of signals to a second device;
receiving, from the second device, data indicating a first phase difference of the plurality of phase differences;
based on the first phase difference, determining that a line of sight (LOS) path between the first device and the second device is unobstructed; and
based on determining that the LOS path between the first device and the second device is unobstructed, determining a transmit power associated with the first phase difference.

2. The method of claim 1, wherein the first device is configured to store data indicating, for each of the plurality of phase differences, a maximum power transmittable by the plurality of antennas to satisfy an effective isotopic radiated power (EIRP) threshold, and wherein the transmit power associated with the first phase difference comprises the maximum power transmittable by the plurality of antennas at the first phase difference to satisfy the EIRP threshold.

3. The method of claim 1, further comprising causing sending of a signal by the plurality of antennas to the second device based on the transmit power corresponding to the first phase difference.

4. The method of claim 1, further comprising:
based on determining that a PHY rate associated with a second phase difference of the plurality of phase differences is less than a PHY rate associated with the first phase difference, causing sending of a signal from the plurality of antennas to the second device based on the transmit power associated with the first phase difference.

5. The method of claim 1, further comprising:
based on determining that a PHY rate associated with a second phase difference of the plurality of phase differences is greater than a PHY rate associated with the first phase difference, causing sending of a signal from the plurality of antennas to the second device based on a transmit power associated with the second phase difference.

6. The method of claim 1, wherein determining that the LOS path between the first device and the second device is unobstructed comprises:
based on the first phase difference, determining a direction from the first device; and
determining that the direction is pointed at a location of the second device.

7. The method of claim 1, wherein the first device comprises a gateway device, and wherein the second device comprises at least one of a computer or a mobile phone.

8. The method of claim 1, wherein the plurality of signals comprise sounding signals.

9. A method comprising:
causing, by a first device comprising a plurality of antennas associated with a plurality of phase differences, sending of a plurality of signals to a second device, wherein each of the plurality of phase differences is associated with a particular maximum transmit power that satisfies a threshold;
receiving, from the second device, data indicating a first phase difference of the plurality of phase differences;
based at least on the first phase difference, determining that a line of sight (LOS) path between the first device and the second device is obstructed; and based on determining that the LOS path between the first device and the second device is obstructed, determining a transmit power associated with a greatest maximum transmit power that satisfies the threshold.

10. The method of claim 9, wherein the first device is configured to store data indicating, for each of the plurality of phase differences, the particular maximum transmit power that satisfies the threshold.

11. The method of claim 9, further comprising causing sending of a signal by the plurality of antennas to the second device based on the greatest maximum transmit power that satisfies the threshold.

12. The method of claim 9, wherein the threshold comprises an effective isotopic radiated power (EIRP) threshold.

13. The method of claim 9, further comprising:

determining a second phase difference, from the plurality of phase differences, that is associated with a second greatest maximum transmit power that satisfies the threshold; and based on determining that a physical layer (PHY) rate associated with the second greatest maximum transmit power is greater than a PHY rate associated with the greatest maximum transmit power, determining a third phase difference, from the plurality of phase differences, that is associated with a third greatest maximum transmit power that satisfies the threshold; and based on determining that a PHY rate associated with the third greatest maximum transmit power is less than the PHY rate associated with the second greatest maximum transmit power, causing sending of a signal from the plurality of antennas to the second device based on the second greatest maximum transmit power.

14. The method of claim 9, wherein determining that the LOS path between the first device and the second device is obstructed comprises:

based on the first phase difference, determining a direction from the first device; and determining that the direction is not pointed at a location of the second device.

15. The method of claim 9, wherein the first device comprises a gateway device, and wherein the second device comprises at least one of a computer or a mobile phone.

16. A method comprising:

causing, by a first device comprising a plurality of antennas associated with a plurality of phase differences, sending of a plurality of signals to a second device, wherein the first device is configured to store data indicating, for each of the plurality of phase differences, a maximum power transmittable by the plurality of antennas to satisfy a threshold;

based at least on data indicating a phase difference received from the second device, determining if a line of sight (LOS) path between the first device and the second device is obstructed; and based on determining if the LOS path between the first device and the second device is obstructed, determining a maximum transmit power satisfying the threshold at which to transmit a signal from the plurality of antennas to the second device.

17. The method of claim 16, further comprising causing the sending of a signal by the plurality of antennas to the second device based on the maximum transmit power.

18. The method of claim 16, wherein determining if the LOS path between the first device and the second device is obstructed comprises determining that the LOS path between the first device and the second device is obstructed, and wherein the maximum transmit power comprises a greatest maximum power indicated by the data stored by the first device.

19. The method of claim 16, wherein determining if the LOS path between the first device and the second device is obstructed comprises determining that the LOS path between the first device and the second device is unobstructed, and wherein the maximum transmit power is associated with the phase difference.

20. The method of claim 16, wherein the threshold comprises an effective isotopic radiated power (EIRP) threshold.

* * * * *